(12) United States Patent
Yorde et al.

(10) Patent No.: US 10,047,209 B2
(45) Date of Patent: Aug. 14, 2018

(54) REMOVAL OF COLOR FROM THERMOPLASTICS

(71) Applicant: RADCO Infusion Technologies, LLC, Toledo, OH (US)

(72) Inventors: Richard Yorde, Howard, OH (US); Rick Anderson, Waterville, OH (US)

(73) Assignee: RADCO INFUSION TECHNOLOGIES, INC., Toledo, OH (US)

( * ) Notice: Subject to any disclaimer, the term of this patent is extended or adjusted under 35 U.S.C. 154(b) by 37 days.

(21) Appl. No.: 15/161,725

(22) Filed: May 23, 2016

(65) Prior Publication Data

US 2016/0264751 A1 Sep. 15, 2016

Related U.S. Application Data

(62) Division of application No. 14/035,427, filed on Sep. 24, 2013.

(60) Provisional application No. 61/704,871, filed on Sep. 24, 2012.

(51) Int. Cl.
  *C08J 11/04* (2006.01)
(52) U.S. Cl.
  CPC ............ *C08J 11/04* (2013.01); *C08J 2367/02* (2013.01); *Y02P 20/143* (2015.11); *Y02W 30/70* (2015.05)
(58) Field of Classification Search
  CPC ........ C08J 11/04; C08J 11/08; C08J 2367/02; Y02W 30/70; Y02P 20/143
  USPC .................................................. 521/40–49.8
  See application file for complete search history.

(56) References Cited

U.S. PATENT DOCUMENTS

| | | | |
|---|---|---|---|
| 4,720,540 A | 1/1988 | Maresca et al. | |
| 6,733,543 B2 | 5/2004 | Pyles et al. | |
| 6,749,646 B2 | 6/2004 | Pyles et al. | |
| 6,929,702 B1* | 8/2005 | Motsenbocker | C11D 3/43 134/40 |
| 6,949,127 B2 | 9/2005 | Pyles et al. | |
| 6,959,666 B2 | 11/2005 | Marchioro | |
| 6,994,735 B2 | 2/2006 | Pyles et al. | |
| 7,094,263 B2 | 8/2006 | Pyles et al. | |
| 7,175,675 B2 | 2/2007 | Pyles et al. | |
| 7,504,054 B2 | 3/2009 | Pyles et al. | |
| 7,921,680 B2 | 4/2011 | Kaczkowski et al. | |
| 8,206,463 B2 | 6/2012 | Witman et al. | |
| 2005/0028291 A1 | 2/2005 | Bechtold et al. | |

(Continued)

FOREIGN PATENT DOCUMENTS

JP  2004269602 A  9/2004

OTHER PUBLICATIONS

Gupta M., et al., "Decolorization of Colored Poly(ethylene terephthalate) Bottle Flakes Using Hydrogen Peroxide," Journal of Applied Polymer Science, 107:3212-3220, 2008.

(Continued)

*Primary Examiner* — Frances Tischler
(74) *Attorney, Agent, or Firm* — Dinsmore & Shohl LLP

(57) ABSTRACT

Process of decolorizing dyed thermoplastics are provided that includes intermixing a dyed thermoplastic with a decolorization agent solution at a temperature that maintains the crystalline structure of the thermoplastic. The processes for the first time are capable of removing substantial portions of dye from the thermoplastic providing a material that is suitable for recycling processes and use in subsequent recycled articles.

14 Claims, 2 Drawing Sheets

(56) References Cited

U.S. PATENT DOCUMENTS

| | | |
|---|---|---|
| 2005/0198742 A1 | 9/2005 | Berard et al. |
| 2006/0148914 A1 | 7/2006 | Connor et al. |
| 2008/0067124 A1 | 3/2008 | Kaczkowski et al. |
| 2009/0089942 A1 | 4/2009 | Pyles et al. |
| 2009/0297830 A1 | 12/2009 | Pyles et al. |

OTHER PUBLICATIONS

International Search Report and Written Opinion for PCT/US2013/061372 dated Sep. 24, 2013.
International Search Report for PCT/US2013/061372 dated Sep. 24, 2013.
Machine translation of JP 2004-269602, Sakamoto et al, Sep. 30, 2004.

* cited by examiner

REMOVAL OF COLOR FROM THERMOPLASTICS

CROSS REFERENCE TO RELATED APPLICATIONS

This application is a divisional of U.S. patent application Ser. No. 14/035,427 filed Sep. 24, 2013, and depends from and claims priority to U.S. Provisional Application No. 61/704,871 filed Sep. 24, 2012, the entire contents of which are incorporated herein by reference.

FIELD

The invention relates to the decoloration of plastic materials. Aspects of the invention include methods for removing color from thermoplastic materials. Specific methods are provided for the removal of coloration from polyethylene terephthalate.

BACKGROUND

Thermoplastics are used on a large scale for the manufacture of bottles such as those extensively used to package beverages including carbonated soft drinks, beer, or mineral water. Many bottle manufacturers prefer using colored bottles. Typical bottle colorations include greens, reds, yellows, browns, and mixtures of colors.

During manufacture, if the eventual bottle is to be colored, one or more dyes are typically admixed with thermoplastic granules charged to the hopper of the injection molding machine used to make the bottle preform. For this purpose the colorant or mixture of colorants can be added as a solid concentrate or in powder form or as a dispersion in a liquid carrier. Additives such as UV filters, oxygen absorbers, antimicrobial agents, antioxidants, light stabilizers, optical brighteners, processing stabilizers, or flame retardants, among others may also be added to the thermoplastic molding composition at or around the same time.

Recent processes of providing coloration to a thermoplastic involve infusing a thermoplastic material with a dye in a dye bath such as is found in U.S. Pat. No. 7,175,675, or by spraying a colorant onto the surface of the article as described in U.S. Pat. No. 6,994,735. Upon formation of the final product, the colored layer is stretched to less than 1 millimeter (mm) in depth, but still provides sufficient coloration to provide a desirable packaging for sale to a consumer.

Unfortunately, the use of color in recyclable thermoplastics presents numerous difficulties for future uses. The presence of the dye in the thermoplastic material is difficult to remove so as to allow subsequent use in future applications requiring clear or non-colored recycled material. Many attempts have been made to remove this color. For example, the dyes have been attempted to be removed by washing steps such as a caustic wash, by heating to damage the dye structure, or by exposing the material to an energy source such as ultraviolet (UV) light. To date, these methods have been unable to remove sufficient coloration of the recycled material for it to be useful. For example, the process of U.S. Patent Application Publication No. 2006/0148914 shows some color change, but as is described therein, full color is not removed from the material. Other attempts at removing color resulted in a yellow tint to the material that is non-removable, thus contaminating any recycled material and limiting its use in only future colored articles.

As such, there is a long felt need for processes of removing color from thermoplastics during recycling such that the output stream is capable of being used for applications requiring color free materials.

SUMMARY

The following summary of the invention is provided to facilitate an understanding of some of the innovative features unique to the present invention and is not intended to be a full description. A full appreciation of the various aspects of the invention can be gained by taking the entire specification, claims, drawings, and abstract as a whole.

While recycling of post-consumer plastic materials has been practiced for many years, the presence of dyes in colored plastics regularly confounds the recycling process when the recycled material stream is intended to be subsequently used in the manufacture of clear materials. The present invention provides for the first time effective methods of removing color from thermoplastics, illustratively color infused thermoplastics. As such, it is a primary object of the invention to decolorize thermoplastic or other materials. A process includes providing a thermoplastic material in solid form, comprising one or more dyes present in the thermoplastic material, the dye imparting color to the thermoplastic material; mixing, immersing, or coating the thermoplastic material with a decolorizing agent solution for a decolorization time, optionally of 10 minutes or less, and at a decolorization temperature that maintains the crystalline state of the thermoplastic material. The decolorization solution includes one or more decolorizing agents; and decolorizing the thermoplastic material by the mixing step thereby forming a decolorized thermoplastic material. A decolorization temperature in many aspects of the invention may be from 60 degrees Celsius to 98 degrees Celsius, optionally form 81 and 91 degrees Celsius. The inventors have discovered that decolorization agents according to Formula I $R^1-[(O(CH_2)_m)_n-]OR^2$ (I) wherein $R^2$ and $R^1$ are each independently H or a $C_{1-18}$ alkyl, benzyl, benzoyl, or phenyl; n is 1, 2 or 3; and m is any value from 1 to 35 are useful in removing color from a colored thermoplastic. In many aspects, $R^1$ is an ethyl, propyl or butyl. Optionally, m is 2, 3 or 4. Optionally, n is 2 or 3. In some aspects, a decolorization agent according to Formula I is 2-butoxyethanol. Optionally, a decolorization agent is a hypohalide, optionally sodium hypochlorite. In some aspects, the thermoplastic is irradiated in addition to the mixing step. A thermoplastic is optionally polyethylene terephthalate or polycarbonate.

DETAILED DESCRIPTION

Figure 1:
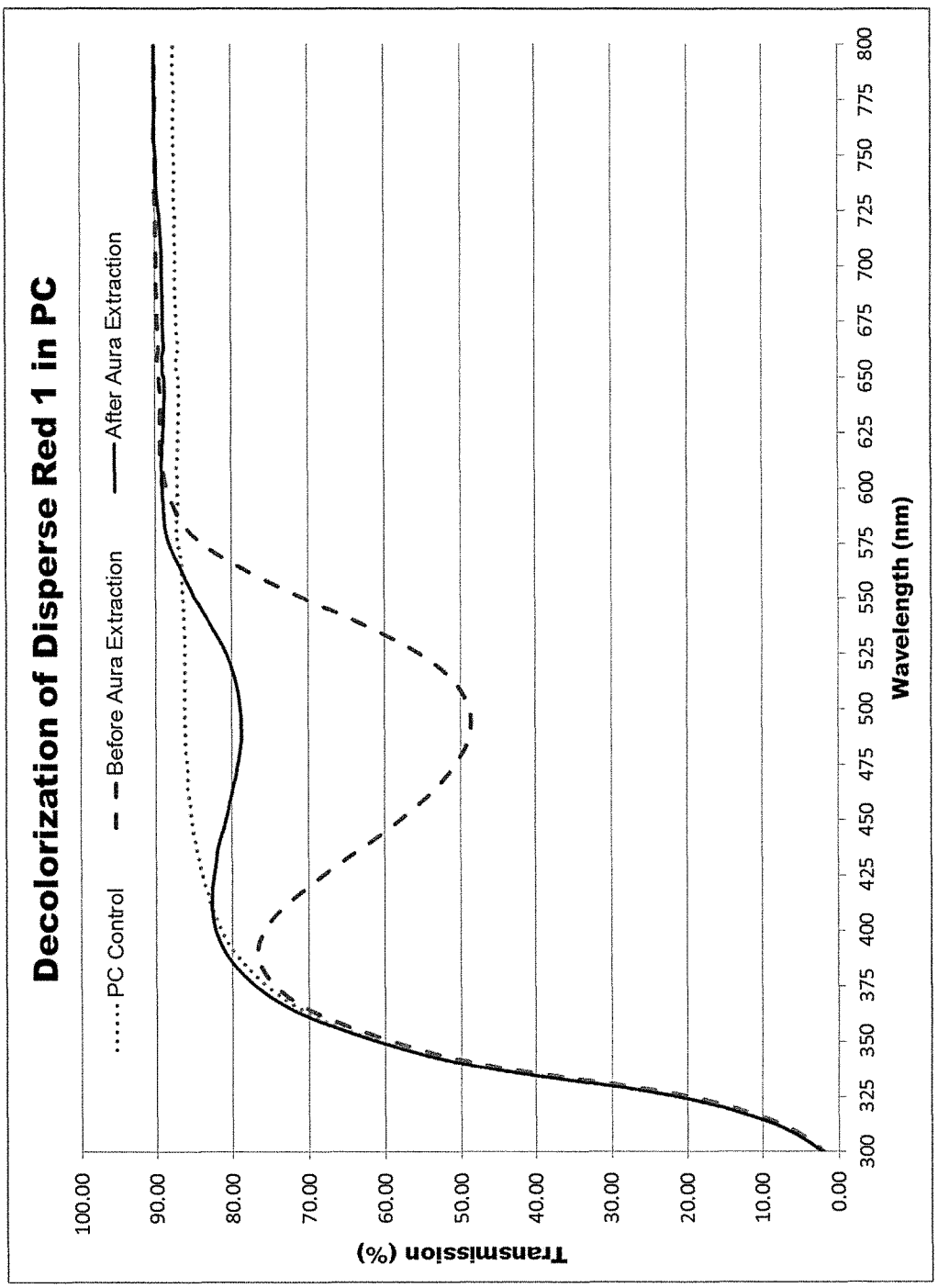
FIG. 1 illustrates transmission profiles of polycarbonate colored or decolorized according to one aspect of the invention.

The following description of aspect(s) is merely exemplary in nature and is in no way intended to limit the scope of the invention, its application, or uses, which may, of course, vary. The invention is described with relation to the non-limiting definitions and terminology included herein. These definitions and terminology are not designed to function as a limitation on the scope or practice of the invention but are presented for illustrative and descriptive purposes only. While the processes are described as an order of individual steps or using specific materials, it is appreciated that described steps or materials may be interchangeable such that the description of the invention includes multiple parts or steps arranged in many ways as is readily appreciated by one of skill in the art.

The processes provided are useful for removal of color from thermoplastics such as PET, as one example. Currently, multi-colored plastic bottles and the like are not easily or cost effectively recyclable because in part it is not economically viable to do so. Coloring agents (e.g. dyes) present in waste bottles to be recycled causes the recycling value of such bottles to be quite low. The processes provided increase the economic value of such recycled materials.

The invention has utility as a method for removing color from thermoplastic materials. Although much of the invention is described with respect to polyethylene terephthalate (PET), many aspects are similarly useful for other thermoplastic types.

A process of decolorizing a thermoplastic material is provided including optionally providing or otherwise obtaining a thermoplastic material in solid form, wherein the thermoplastic material is colored by one or more dyes admixed with the thermoplastic material, infused into the thermoplastic material, or coated on the thermoplastic material. A colored thermoplastic material is optionally at least a portion of post-consumer material. Optionally, a colored thermoplastic material is entirely post consumer material. A process of decolorizing a thermoplastic material includes mixing the colored solid thermoplastic material with a decolorizing agent solution including one or more decolorizing agents whereby the decolorizing agent alone or in combination with one or more environmental conditions (e.g. heat, UV light) produces a decolorized thermoplastic material.

A process includes obtaining or providing a colored thermoplastic material. A thermoplastic material is optionally one or more of polypropylene (PP), polyethylene terephthalate (PET), polybutylene terephthalate (PBT), polycarbonates (PC), polyethylene (PE), polylactic acid (PLA), nylon, PET copolymers, acrylics, Surlyn™, polyethylene naphthalate (PEN), polyamides, polycarbonate co-polymers, elastomeric polymers—thermoplastic elastomers, thermoplastic urethanes, poly urethanes, acrylic co-polymers, acrylonitrile butadiene styrene, or other thermoplastics. In some aspects, a thermoplastic is polyethylene terephthalate (PET). The colored thermoplastic material optionally has a dye that is limited to the outer surface of the colored thermoplastic, optionally penetrating to a depth of 1 mm or less.

A colored thermoplastic is optionally that formed by any of several processes. In some aspects, a colored thermoplastic is formed by the processes of U.S. Pat. Nos. 6,733,543; 6,749,646; 7,175,675; 7,504,054; 6,959,666; 6,949,127; 6,994,735; 7,094,263; 8,206,463; or 7,921,680. In some aspects, a colored thermoplastic is formed as described in U.S. Patent Application Publication Nos: 2008/0067124; 2009/0297830; or 2009/0089942.

During recycling, a colored thermoplastic is typically washed, flaked or pelletized, or reacted to constituents, re-polymerized and then pelletized and then supplied to a solid-state reactor, in the process of converting waste plastic into recyclable articles. In several aspects, the colored thermoplastic is flaked to produce substantially uniform particles for efficient subsequent processing.

The dye that is altered or removed according to some aspects is a stable dye or an unstable dye. In some aspects, a dye is an unstable dye. An unstable dye as defined herein is a dye that is chemically or structurally alterable by exposure to heat, light energy, or both. Several such dyes are known in the art. An unstable dye optionally includes azo type dyes or unstabilized quinone dyes. Optionally, a dye is a static dye, photochromic dye or combinations thereof. As used herein, the term "static dyes" means a dye that does not substantially change color upon exposure to (or being shielded from) ultraviolet (UV) light. The term "photochromic dyes" as used herein and the claims means dyes that reversibly change color upon exposure to UV light, as is known to the skilled artisan. In some aspects, a dye is a thermoliable dye.

Static dyes that may be included in a colored thermoplastic and by an inventive process removed or chemically altered include, for example, fabric dyes and disperse dyes as well as dyes that are known in the art as being suitable for tinting plastic articles, such as thermoplastic PET or polycarbonate articles. Examples of suitable disperse dyes include, but are not limited to, Disperse Blue #3, Disperse Blue #14, Disperse Yellow #3, Disperse Red #13 and Disperse Red #17. The classification and designation of the static dyes are recited herein in accordance with "The Colour Index", $3^{rd}$ edition published jointly by the Society of Dyes and Colors and the American Association of Textile Chemists and Colorists (1971). The term static dye as used herein optionally includes mixtures of static dyes.

Illustrative examples of static dyes include the water-insoluble azo, diphenylamine and anthraquinone compounds. Illustrative examples include acetate dyes, dispersed acetate dyes, dispersion dyes and dispersal dyes, such as are disclosed in Colour Index, $3^{rd}$ edition, vol. 2, The Society of Dyers and Colourists, 1971, pp. 2479 and pp. 2187-2743, respectively. Specific examples of dispersal dyes include Solvent Blue 59 (9,10-Anthracenedione, 1,4-bis(ethylamino)-), Solvent Red 111 (9,10-Anthracenedione, 1-(methylamino)-), Solvent Yellow 160:1 (3-(5-Chloro-2-benzoxazolyl)-7-(diethylamino)-2H-1-benzopyran-2-one), Disperse Orange 47 (1H-Indole-5-carboxylicacid,2-[2-(1,5-dihydro-3-methyl-5-oxo-1-phenyl-4H-pyrazol-4-ylidene) ethylidene]-2,3-dihydro-1,3,3-trimethyl-methyl ester), Disperse Yellow 3 (Acetamide, N-[4-[2-(2-hydroxy-5-methylphenyl)diazenyl]phenyl]-), Solvent Violet 26 (1,4-Diamino-2,3-diphenoxyanthraquinone), Disperse Red (4-[(2-Hydroxyethypethylamino]-4'-nitroazobenzene), and Solvent Green 28 (1,4-bis[(1,4.butylphenyl)amino]-5,8-dihydroxy-9,10-anthracenedione). Other dyes are illustratively those additional dyes found in U.S. Pat. No. 7,175,675 and references cited therein.

In an exemplary process, a colored thermoplastic material is mixed with a decolorizing agent solution including one or more decolorizing agents. A decolorization agent solution is optionally an aqueous solution, or a solution of one or more organic solvents or solutes. A decolorization agent solution is optionally entirely formed of a decolorization agent. In some aspects, a decolorization agent solution includes water, a decolorization agent, and optionally one or more additives. An additive is illustratively one more surfactants or emulsifiers. A decolorization agent solution is optionally free of a dye prior to mixing with a colored thermoplastic. Optionally, a decolorization agent solution includes one or more secondary dyes wherein a secondary dye is any dye described herein, but of different dye chemical structure than that contained in the thermoplastic material to be decolorized. As such, a decolorization agent solution optionally serves to alter the color characteristics of a thermoplastic during a recycling process to yield a different output color.

A decolorization agent solution is optionally an aqueous solution wherein water is present in an amount of less than or equal to 98 percent by weight, optionally less than or equal to 80 percent by weight, optionally less than or equal to 75 percent by weight. In some aspects, water is present in a decolorization agent solution in an amount of at least 50 or 51 percent by weight, optionally at least 60 percent by weight, and optionally at least 65 percent by weight. Water may be present in the decolorization agent solution in an amount ranging from 50 to 85 percent by weight or any value or range therebetween. For example, water may be present in the decolorization agent solution in an amount from 50 (or 51) to 85 percent by weight, optionally 60 to 87 percent by weight, optionally in an amount of from 65 to 75 percent by weight, optionally 70 percent by weight. In some aspects, water is present from 85 to 99 percent by weight, optionally 90 to 98 percent, optionally 95 to 98 percent by weight, optionally 98 percent by weight. The percent weights being based on the total weight of the decolorization agent solution. The water used is optionally deionized water or distilled water the preparation of each of which is well known in the art.

A decolorization agent is optionally an oxidizing agent, a free radical precursor, or a compound having the formula of Formula I:

$$R^1-[(O(CH_2)_m)_n-]OR^2 \quad (I)$$

where wherein $R^2$ and $R^1$ are each independently H or a $C_{1-18}$ alkyl radical, benzyl radical, benzoyl radical, or phenyl radical; n is 1, 2 or 3; and m is any value from 1 to 35. In some aspects, m is 1 to 12. In some aspects, m is 1. Optionally, $R^2$ denotes butyl and $R^1$ denotes H.

An aromatic $R^1$ or $R^2$ group of Formula I is optionally substituted with 1 to 5 groups selected from halo groups (e.g., chloro, bromo and fluoro), linear or branched $C_1$-$C_9$ alkyl groups (e.g., methyl, ethyl, propyl, butyl, pentyl, hexyl, heptyl, octyl and nonyl), and aromatic groups (e.g., phenyl).

In some aspects, a process of decolorization involves removing the dye from the colored thermoplastic material. In such aspects, the decolorization agent of Formula I is particularly well suited. In some aspects, such non-destructive dye removal steps are the sole steps used to decolor the colored thermoplastic. In some aspects, the non-destructive decolorization agents are used in combination with a destructive decolorization agent, either simultaneously or sequentially in either order. A destructive decolorization agent is an oxidizing agent, a reducing agent, a free radical precursor or combinations thereof.

In some aspects, a decolorization agent is an oxidizing agent. An oxidizing agent is optionally a peroxide or a hypohalide such as a hypochlorite and salt forms thereof. A hypohalide is optionally a hypochlorite. A hypochlorite is optionally a salt form such as that complexed with sodium or calcium, among others.

In some aspects, a decolorization agent is an organic or inorganic peroxide such as those useful as an oxidizing agent a free radical precursor or both. A peroxide has the structure of Formula II:

$$R^3-O-O-R^4 \quad (II)$$

where $R^3$ and $R^4$ are each independent of the other a hydrogen, alkyl, aryl, heteroaryl, acyl, silicon-containing group, germanium containing group, phosphorus-containing group, titanium containing group, organometallic compound, carbonate, carbamate, or a repeating unit of a polymeric structure. $R^3$ and $R^4$ may also be joined in a cyclic structure.

Without being limited to a particular theory, a peroxide may achieve decolorization of a colored thermoplastic by dissociation to form at least one radical. The resulting radical reacts with the dye(s) in the colored thermoplastic to decolorize or denature the dyes. Particular peroxides and other free radical precursors are illustrated in U.S. Patent Application Publication No. 2006/0148914. In some aspects, a peroxide is combined with a catalyst to generate a free radical compound. A catalyst is any known catalyst, optionally iron such as ferrous iron (II), or a photocatalyst such as a semiconductor, optionally titanium dioxide.

The decolorization agent is typically present in the decolorization agent solution in an amount of less than or equal to 30 percent by weight, optionally less than or equal to 25 percent by weight, optionally less than or equal to 20 percent by weight. The decolorization agent is optionally present in the solution in an amount of at least 10 percent by weight, optionally at least 15 percent by weight, optionally at least 17 percent by weight. The decolorization agent may be present in the solution in an amount ranging from 10 to 30 percent by weight or any value or range therebetween. For example, the decolorization agent is optionally present in the solution in an amount from 10 to 30 percent by weight, optionally from 15 to 25 percent by weight, optionally in an amount of from 17 to 20 percent by weight. The percent weights being based on the total weight of the decolorization agent solution.

A decolorization agent solution optionally includes one or more emulsifiers. Illustrative examples of an emulsifier include ionic or non-ionic emulsifiers, or mixtures thereof. Illustrative examples of an anionic emulsifier include: amine salts or alkali salts of carboxylic, sulfamic or phosphoric acids, for example, sodium lauryl sulfate, ammonium lauryl sulfate, lignosulfonic acid salts, ethylene diamine tetra acetic acid (EDTA) sodium salts, and acid salts of amines, such as, laurylamine hydrochloride or poly(oxy-1,2-ethanediyl), α-sulfo-omega-hydroxy ether with phenol 1-(methylphenyl) ethyl derivative ammonium salts. An emulsifier is optionally an amphoteric emulsifier illustratively: lauryl sulfobetaine; dihydroxy ethylalkyl betaine; amido betaine based on coconut acids; disodium N-lauryl amino propionate; or the sodium salts of dicarboxylic acid coconut derivatives. Typical non-ionic emulsifiers include ethoxylated or propoxylated alkyl or aryl phenolic compounds, such as octylphenoxypolyethyleneoxyethanol. A specific emulsifier used is diethylene glycol.

An emulsifier is optionally present in a decolorization agent solution in an amount from 0 to 15 weight percent, optionally 7 to 15 weight percent, optionally 10 to 15 weight percent.

One example of a decolorization agent solution is LEVEGAL DLP available from Lanxess, LLC, which is a preformulated mixture of a decolorization agent (polyglycol ether) with emulsifiers.

A decolorization agent solution is optionally at ambient temperature (approximately 25° C.) or heated above ambient temperature. In some aspects, a decolorizing process includes heating a colored thermoplastic alone or in the presence of a decolorization agent solution. Optionally, a decolorization agent solution is preheated or heated in the presence of a colored thermoplastic, optionally to any decolorization temperature less than 100° C. Optionally, a decolorization temperature is between 81° C. and 91° C. It has been discovered that, when using an oxidizing agent or free radical generator as a decolorization agent, heating the decolorization agent solution to 88° C. to 95° C. produces significantly greater decolorization. It was believed, particularly with respect to use with PET, that the decolorization temperature should not exceed 82° C. so as to maintain the crystalline structure of the material and reduce hazing due to UV irradiation. Thus, it was surprising that this slight increase in temperature produces significantly better results in removing all visible color from the thermoplastic material.

A process for forming a decolorized thermoplastic material optionally includes mixing a colored thermoplastic material with a decolorization agent solution for a decolorization time. Mixing is optionally immersing a colored thermoplastic material in a decolorization agent solution, spraying a decolorization agent solution on a colored thermoplastic, or other mixing recognized by one of skill in the art. A decolorization time is optionally any time from 1 minute to 120 minutes, or more. A decolorization time is optionally from 1 minute to 30 minutes, optionally from 1 minute to 20 minutes, optionally from 1 minute to 10 minutes, optionally from 5 minutes to 10 minutes. A decolorization time is optionally 1, 2, 3, 4, 5, 6, 7, 8, 9, 10, 15, 20, 25, or 30 minutes. It was expected that a decolorization time required to produce a fully decolorized material would be 120 minutes or greater. It was, in contrast, surprisingly discovered that full decolorization could be achieved in less than 20 minutes, in some aspects less than 10 minutes.

It is appreciated that full decolorization as used herein is decolorization sufficient to be used in subsequent applications of the thermoplastic material that require clear thermoplastics. In some aspects, full decolorization results in a thermoplastic material with a Yellowness Index (YI) of 0.5 to 2.5, or any value or range therebetween.

A process of for forming a decolorized thermoplastic material optionally includes irradiating the thermoplastic material subsequent to or simultaneous with the step of mixing. Irradiating is optionally used to produce a radical from a decolorization agent, to directly interact with a dye, or both. Irradiating is optionally exposing a colored thermoplastic material to light with a wavelength from 200 to 400 nm. Optionally, a wavelength is from 250 to 350 nm, optionally from 310 to 320 nm. Irradiating is optionally exposing a colored thermoplastic material to light with a wavelength of 312 nanometers, optionally plus or minus 5 nm or 10 nm. Irradiating is optionally exposing a colored thermoplastic material to light with a wavelength of 254 nanometers, optionally plus or minus 5 nm or 10 nm. A source for UV light is optionally a UV lamp such as that obtainable from Dymax, Corp., Torrington, Conn. A thermoplastic is optionally irradiated for an irradiation time. An irradiation time is optionally 1 minute to 30 minutes, or any value or range therebetween. An irradiation time is optionally 1 minute to 20 minutes, optionally 3 minutes to 10 minutes, optionally 5 minute to 7 minutes. An irradiation time is optionally 1, 2, 3, 4, 5, 6, 7, 8, 9, or 10 minutes. An irradiation time is optionally 5 minutes. An irradiation time is optionally 7 minutes.

Following a decolorization time, a decolorization agent solution is optionally itself subjected to a recycling process to remove dye materials from the solution. The purification of the decolorization agent solution is optionally achieved by passing the used decolorization agent solution through activated carbon, mechanical filtering, skimming, or combinations thereof. The activated carbon may be in the form of a column, a bed, or any other configuration that will allow the passage of the used decolorization agent solution resulting in a dye-free decolorization agent solution suitable for reuse.

It has been found that the provided processes for forming a decolorized thermoplastic are far superior to other processes described in the art. It is common that color changes can be achieved by prior processes, but none of these processes are capable of removing a remaining yellow or brown color to the decolorized materials. The inventive processes provide a decolorized thermoplastic that is fully decolorized and suitable for use in subsequent material production requiring clear thermoplastic materials.

The decolorized thermoplastic made according to the invention may be used in making containers or bottles, in which the total recycle content in such bottles may be quite low, relatively high, or entirely containing recycled material, depending upon the application. Thus, some aspects involve the manufacture of an article using at least some content that is recycled thermoplastic that has been substantially decolorized by one or more processes provided. Illustrative examples of an article include bottles, computer face-plates, keyboards, bezels and cellular phones, color coded packaging and containers of all types, including ones for industrial components, residential and commercial lighting fixtures, components in building and in construction, tableware, including plates, cups and eating utensils, small appliances and their components, optical and sun-wear lenses, as well as decorative films including such films that are intended for use in film insert molding. In some aspects, and article is a bottle made of at least a portion or entirely of recycled PET. Methods of forming bottles are well known in the art.

Various aspects of the present invention are illustrated by the following non-limiting examples. The examples are for illustrative purposes and are not a limitation on any practice of the present invention. It will be understood that variations and modifications can be made without departing from the spirit and scope of the invention. Reagents illustrated herein are commonly commercially available, and a person of ordinary skill in the art readily understands where such reagents may be obtained.

EXAMPLES

Example 1: Decoloration Using an Oxidizing Decolorization Agent and Environmental Mediators Six pounds of color infused PET is flakes as per standard recycling procedure and divided into 75 gram samples. A set of aqueous decolorizing agent solutions are made containing 850 ml of water and 250 ml of 6% commercial sodium hypochlorite (CLOROX) to produce a final chlorine concentration of about 1.3%. Each decolorizing agent solution is heated to a temperature between 81° C. and 91° C. One 75 gram sample of PET flake is added to each decolorizing agent solution under stirring and exposed to UV light of wavelength between 200 and 400 nm for 7 minutes. The flake was then removed, filtered, and rinsed twice in water to remove residual decolorizing agent solution, and then allowed to dry at ambient temperature overnight.

While each of the different temperature clarified the PET, the best results are reached when the decolorizing agent solution is at or in excess of 87° C. and better above 88° C. No appreciable yellow hue common to prior procedures is observed.

The experiments are repeated using several other thermoplastics including polycarbonate, polyamide, and polyethylene with similar results to that achieved with PET.

Example 2: Direct Decoloration

Samples of PET and PC (75 grams each) previously infused with Disperse Red 1 are divided among several decolorizing agent solutions containing water (70% w/w), decolorizing agent (2-butoxyethanol) (20% w/w) and emulsifier (diethylene glycol) (10% w/w). Each decolorizing agent solution is preheated to a temperature of 90° C. The thermoplastics are immersed in decolorizing agent solution for a period of 5 minutes. The samples are removed, rinsed in water, and dried overnight at ambient temperature.

Figure 2:
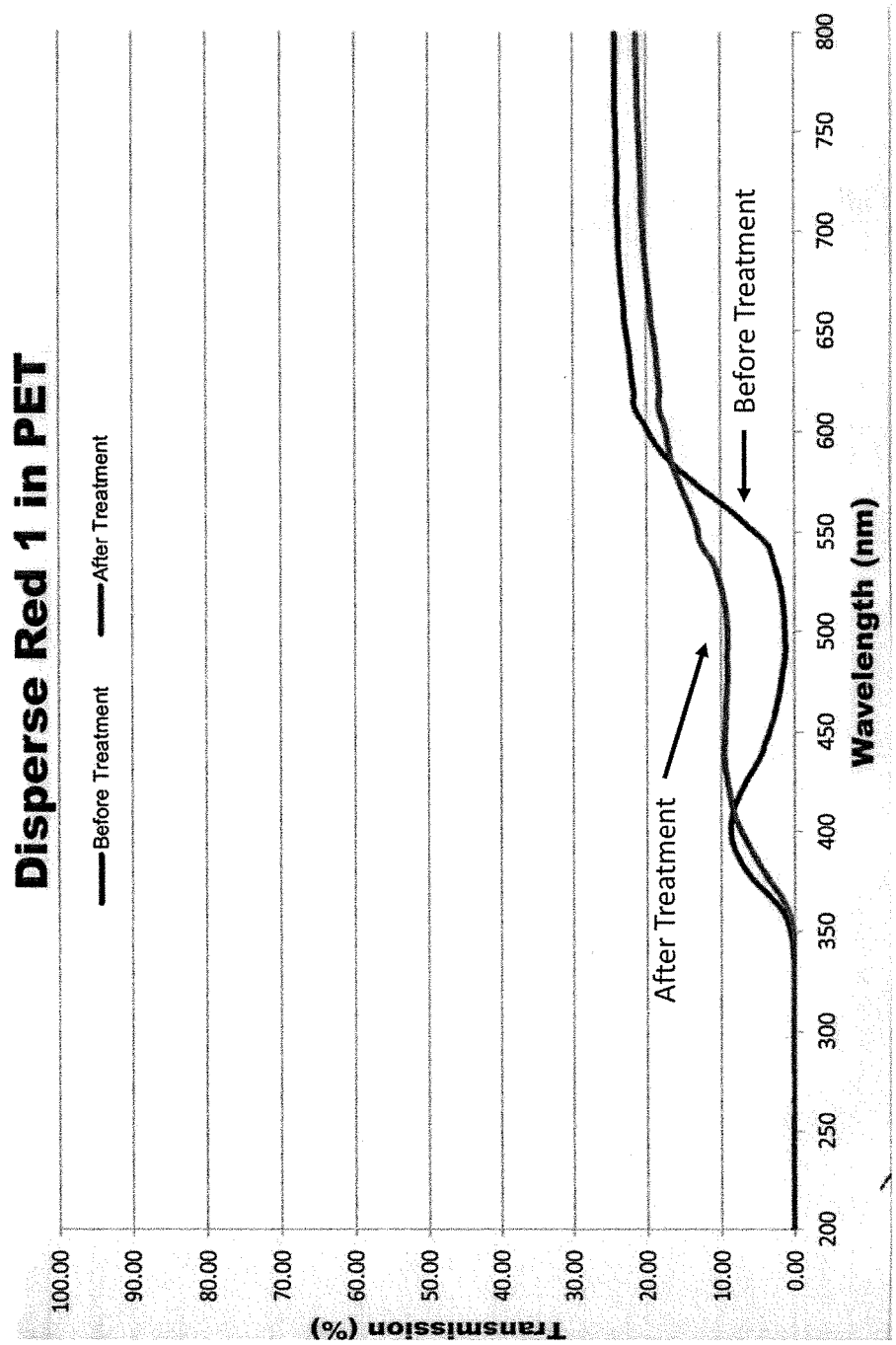
FIG. 2 illustrates transmission profiles of Disperse Red dyed PET colored or decolorized according to one aspect of the invention.

The decolored samples are subjected to UV/Vis spectroscopy and the change of color recorded. FIG. 1 illustrates a UV/Vis spectra of dyed polycarbonate before and after treatment demonstrating that the thermoplastic after treatment is substantially similar to untreated PC. FIG. 2 illustrates dyed PET before and after treatment demonstrating that PET also returns to a spectra with much greater similarity to uncolored PET controls. Table 1 illustrates the change in color by both the Lab color space (Lab) measurement scale and the XYZ scale calculated from the Lab color measurements.

TABLE 1

|  | L | A | B | Haze | δ E |
|---|---|---|---|---|---|
| Flake molded into plaques: | | | | | |
| 100% Control | 88.65 | −1.00 | 3.77 | 7.01 | |
| 100% Dyed Untreated | 80.29 | 16.88 | 24.53 | 5.99 | 7.78 |
| 100% Dyed Treated | 84.62 | 3.59 | 17.76 | 7.76 | 5.39 |
| 100% Dyed Treated (Dark pieces removed) | 86.05 | 1.39 | 13.36 | 8.94 | 4.33 |
| 75% Control/25% Treated | 87.80 | 0.69 | 6.94 | 7.12 | 2.83 |
| 50% Control/50% Treated | 87.02 | 1.44 | 10.02 | 7.03 | 3.76 |
| Flake color data: | | | | | |
| 100% Control flake | 68.48 | −0.45 | −0.41 | | |
| 100% Standard treated flake | 68.15 | 10.51 | 3.15 | | 5.33 |
| 100% Best Case flake | 75.30 | −0.12 | 4.01 | | 4.81 |

|  | X | Y | Z | Y.I. | δ Y.I. |
|---|---|---|---|---|---|
| Flake molded into plaques: | | | | | |
| 100% Control | 69.15 | 73.43 | 73.95 | 6.75 | — |
| 100% Dyed Untreated | 60.79 | 56.68 | 36.96 | 64.58 | 57.82 |
| 100% Dyed Treated | 64.48 | 66.01 | 51.18 | 37.97 | 31.21 |
| 100% Dyed Treated (Dark pieces removed) | 65.06 | 67.99 | 58.80 | 25.09 | 18.33 |
| 75% Control/25% Treated | 68.95 | 72.07 | 69.64 | 13.41 | 6.65 |
| 50% Control/50% Treated | 66.99 | 70.01 | 64.06 | 19.30 | 12.55 |
| Flake color data: | | | | | |
| 100% Control flake | 35.79 | 37.97 | 42.20 | −5.12 | — |
| 100% Standard treated flake | 37.30 | 37.97 | 33.36 | 26.81 | 31.93 |
| 100% Best Case flake | 45.89 | 48.28 | 48.65 | 7.81 | 12.93 |

These data demonstrate significant change in yellowness index representative of highly clarified thermoplastic material suitable for use in subsequent non-colored applications.

Various modifications of the present invention, in addition to those shown and described herein, will be apparent to those skilled in the art of the above description. Such modifications are also intended to fall within the scope of the appended claims.

It is appreciated that all reagents are obtainable by sources known in the art unless otherwise specified.

Patents and publications mentioned in the specification are indicative of the levels of those skilled in the art to which the invention pertains. These patents and publications are incorporated herein by reference to the same extent as if each individual application or publication was specifically and individually incorporated herein by reference.

The foregoing description is illustrative of particular aspects of the invention, but is not meant to be a limitation upon the practice thereof. The following claims, including all equivalents thereof, are intended to define the scope of the invention.

We claim:

1. A process for forming a decolorized thermoplastic material comprising:
   mixing a colored thermoplastic material in solid form with a decolorization agent solution comprising water, diethylene glycol, and 2-butoxyethanol;
   said thermoplastic material penetrated with one or more dyes providing color to said thermoplastic material;
   heating said colored thermoplastic material to a decolorization temperature that maintains the crystalline structure of said thermoplastic material, said step of heating for a decolorization time subsequent to or simultaneous with said step of mixing; and
   decolorizing said thermoplastic material by said mixing step and by said heating step, thereby forming a decolorized thermoplastic material.

2. The process of claim 1 further comprising the step of irradiating said thermoplastic material subsequent to or simultaneous with said step of mixing.

3. The process of claim 1 wherein said decolorization agent solution is substantially free of a dye prior to said step of mixing.

4. The process of claim 1 wherein said thermoplastic material is polyethylene terephthalate.

5. The process of claim 1 wherein said step of heating is by immersing said thermoplastic material in said decolorization agent solution, said decolorization agent solution preheated to said decolorization temperature.

6. The process of claim 1 wherein said decolorization temperature is less than 100 degrees Celsius.

7. The process of claim 1 wherein said decolorization temperature is between 81 and 91 degrees Celsius.

8. The process of claim 1 wherein said dye penetrates said thermoplastic material to less than 1 millimeter prior to said step of mixing.

9. The process of claim 1 wherein said decolorized thermoplastic is clear.

10. The process of claim 1 wherein said decolorized thermoplastic is colorless.

11. The process of claim 1 wherein said dye is a thermolabile dye.

12. The process of claim 1 wherein said dye is an unstable dye.

13. The process of claim 1 wherein said dye is an azo or quinone dye.

14. The process of claim 1 wherein said dye is Disperse Red 1.

* * * * *